US010455427B2

United States Patent
Cui et al.

(10) Patent No.: US 10,455,427 B2
(45) Date of Patent: Oct. 22, 2019

(54) FREQUENCY ALLOCATION METHOD AND DEVICE FOR UNAUTHORIZED FREQUENCY BAND

(71) Applicant: SONY CORPORATION, Tokyo (JP)

(72) Inventors: Qimei Cui, Beijing (CN); Jiahui Liu, Beijing (CN); Xiang Zhou, Beijing (CN); Xiaofeng Tao, Beijing (CN)

(73) Assignee: SONY CORPORATION, Tokyo (JP)

( * ) Notice: Subject to any disclaimer, the term of this patent is extended or adjusted under 35 U.S.C. 154(b) by 100 days.

(21) Appl. No.: 15/572,565

(22) PCT Filed: Apr. 13, 2016

(86) PCT No.: PCT/CN2016/079168
§ 371 (c)(1),
(2) Date: Nov. 8, 2017

(87) PCT Pub. No.: WO2016/184277
PCT Pub. Date: Nov. 24, 2016

(65) Prior Publication Data
US 2018/0139615 A1 May 17, 2018

(30) Foreign Application Priority Data
May 15, 2015 (CN) .......................... 2015 1 0250390

(51) Int. Cl.
*H04W 28/02* (2009.01)
*H04W 16/10* (2009.01)
(Continued)

(52) U.S. Cl.
CPC ........... *H04W 16/10* (2013.01); *H04W 16/14* (2013.01); *H04W 24/10* (2013.01);
(Continued)

(58) Field of Classification Search
CPC . H04W 16/10; H04W 74/0808; H04W 28/26; H04W 28/085; H04W 24/10;
(Continued)

(56) References Cited

U.S. PATENT DOCUMENTS 8,874,124 B2 * 10/2014 Clegg ................... H04L 5/0062
455/452.1
2010/0216478 A1 * 8/2010 Buddhikot ............ H04W 16/02
455/450
(Continued)

FOREIGN PATENT DOCUMENTS

CN 103168491 A 6/2013
CN 103731837 A 4/2014
(Continued)

OTHER PUBLICATIONS

International Search Report dated Jul. 1, 2016, in PCT/CN2016/079168, filed Apr. 13, 2016.

*Primary Examiner* — Marcus Hammonds
(74) *Attorney, Agent, or Firm* — Xsensus LLP

(57) ABSTRACT

A frequency allocation method and device for an unauthorized frequency band. The method includes: a controller acquires a business load status of plural macro base stations having similar coverage ranges and operated by different operators, and generates, based on the business load status, allocation information about an unauthorized frequency band, to mutually exclusively allocate the unauthorized frequency band to plural macro base stations; the macro base stations receive the allocation information about the unauthorized frequency band, to determine the unauthorized frequency band monopolized by the macro base stations from an unauthorized frequency band resource, and generate indicative information about the monopolized unauthorized frequency band; and a small base station receives the indicative information, detects state of the unauthorized
(Continued)

frequency band monopolized by the macro base stations, and dynamically accesses, according to a detecting result, a specific unauthorized frequency baud in the unauthorized frequency band monopolized by the macro base stations.

19 Claims, 5 Drawing Sheets

(51) Int. Cl.
| | |
|---|---|
| *H04W 16/14* | (2009.01) |
| *H04W 24/10* | (2009.01) |
| *H04W 28/08* | (2009.01) |
| *H04W 28/26* | (2009.01) |
| *H04W 72/04* | (2009.01) |
| *H04W 74/08* | (2009.01) |
| *H04W 84/04* | (2009.01) |

(52) U.S. Cl.
CPC ..... *H04W 28/0268* (2013.01); *H04W 28/085* (2013.01); *H04W 28/26* (2013.01); *H04W 72/0453* (2013.01); *H04W 74/0808* (2013.01); *H04W 84/045* (2013.01)

(58) Field of Classification Search
CPC ............. H04W 16/14; H04W 72/0453; H04W 28/0268; H04W 84/045
See application file for complete search history.

(56) References Cited

U.S. PATENT DOCUMENTS

| | | | |
|---|---|---|---|
| 2010/0311435 A1* | 12/2010 | Mueck | H04W 48/20 455/453 |
| 2013/0155991 A1* | 6/2013 | Kazmi | H04W 72/0453 370/329 |
| 2015/0065152 A1* | 3/2015 | Sadek | H04W 72/0453 455/450 |
| 2015/0126207 A1* | 5/2015 | Li | H04W 16/14 455/452.1 |

FOREIGN PATENT DOCUMENTS

| | | |
|---|---|---|
| CN | 104540142 A | 4/2015 |
| WO | 2010/094482 A1 | 8/2010 |

\* cited by examiner

FREQUENCY ALLOCATION METHOD AND DEVICE FOR UNAUTHORIZED FREQUENCY BAND

FIELD

The present disclosure relates to a method and a device for allocating unlicensed frequency bands, and in particular to a method and a device for allocating unlicensed frequency bands among different operators.

BACKGROUND

In the future fifth-generation mobile communication technology, a wireless communication network is evolving towards the direction of network diversification, broadband, synthesis and intelligence. With the popularization of various intelligent terminals, a data flow may increase in a spurt manner. Data traffic is mainly distributed in indoor and hot spots in the future. In this case, a large number of small cells may be deployed to adapt to increasing requirements of data traffic. For example, the concept of small cell is introduced in the Long Term Evolution (LTE) Release 12. Compared with a macro cell having a coverage range of a few kilometers, the small cell has a smaller coverage range, which generally may cover an indoor range of 10 meters or an outdoor range of 2 kilometers. And a small base station may operate in an licensed frequency spectrum and an unlicensed frequency spectrum.

In addition, in the fifth-generation mobile communication technology, the License Assisted Access (LAA) as technology for expanding the Long Term Evolution (LTE) to unlicensed frequency bands has become a research focus. For example, the research project of directly using the unlicensed frequency bands in LTE, i.e., LAA-LTE, has been proposed in the 3rd Generation Partner Project (3GPP) Release 13. In the LAA technology, the unlicensed frequency bands are taken as secondary carriers by carrier aggregation, to participate in data transmission, thereby sharing load with the licensed frequency bands.

It is helpful for the operator to meet requirements of increasing capacity and to improve mobile wideband service, by expanding the LTE to the unlicensed frequency spectrum. In a region of dense data traffic, the LTE system may achieve high-speed data communication and a larger capacity using the unlicensed frequency spectrum, in a case of complementarily co-existing with a wireless local network.

SUMMARY

A controller in a communication system is provided according to an aspect of the present disclosure. The controller includes one or more processors configured to: acquire traffic load statuses of multiple macro base stations having similar coverage; and generate unlicensed frequency band allocation information based on the traffic load statuses, to allocate the unlicensed frequency bands to the multiple macro base stations in a mutually exclusive manner, wherein the multiple macro base stations are operated by different operators.

A device at a macro base station side in a communication system is provided according to another aspect of the present disclosure. The device includes one or more processors configured to: acquire unlicensed frequency band allocation information from a controller in the communication system, to determine unlicensed frequency bands exclusively occupied by a macro base station among unlicensed frequency band resources; and generate information indicating the unlicensed frequency bands exclusively occupied by the macro base station, and notify one or more small base stations within a coverage of the macro base station of the unlicensed frequency bands exclusively occupied.

A device at a small base station side in a communication system is provided according to another aspect of the present disclosure. The device includes one or more processors configured to: determine accessible unlicensed frequency bands for the small base station based on information which is transmitted from a macro base station managing the small base station and which indicates unlicensed frequency bands exclusively occupied by the macro base station or available unlicensed frequency bands; and detect statuses of the accessible unlicensed frequency bands, and dynamically access to a specific unlicensed frequency band among the accessible unlicensed frequency bands based on a result of the detection.

A frequency allocation method for unlicensed frequency bands is provided according to another aspect of the present disclosure. The method includes: acquiring, by a controller, traffic load statuses of multiple macro base stations having similar coverage, and generating unlicensed frequency band allocation information based on the traffic load statuses, to allocate the unlicensed frequency bands to the multiple macro base stations in a mutually exclusive manner, wherein the multiple macro base stations are operated by different operators; receiving, by the macro base station, the unlicensed frequency band allocation information from the controller, to determine an unlicensed frequency bands exclusively occupied by the macro base station among unlicensed frequency band resources, and generating, by the macro base station, information indicating the exclusively occupied unlicensed frequency band; and receiving, by a small base station, the information indicating the unlicensed frequency bands exclusively occupied from the macro base station, detecting, by the small base station, statuses of the unlicensed frequency bands exclusively occupied by the macro base station, and dynamically accessing to a specific unlicensed frequency band among the unlicensed frequency bands exclusively occupied by the macro base station based on a result of the detection.

As to the research project for LTE which utilizes the unlicensed frequency bands, i.e., LAA-LTE, a method and a communication system for frequency allocation of unlicensed frequency bands are provided in the present disclosure. The method and the communication system can effectively and fairly allocate unlicensed frequency band resources to base stations of different operators, thereby expanding the LTE system to the unlicensed frequency bands.

BRIEF DESCRIPTION OF THE DRAWINGS

The present disclosure may be better understood with reference to the description given in conjunction with the drawings hereinafter. The same or similar components are represented by the same or similar reference characters in the drawings. The drawings together with the detailed description below are incorporated in the specification and form a part of the specification, for further illustrating preferred embodiments of the present disclosure and explaining the principle and advantages of the present disclosure. In the drawings.

DETAILED DESCRIPTION OF EMBODIMENTS

Figure 1:
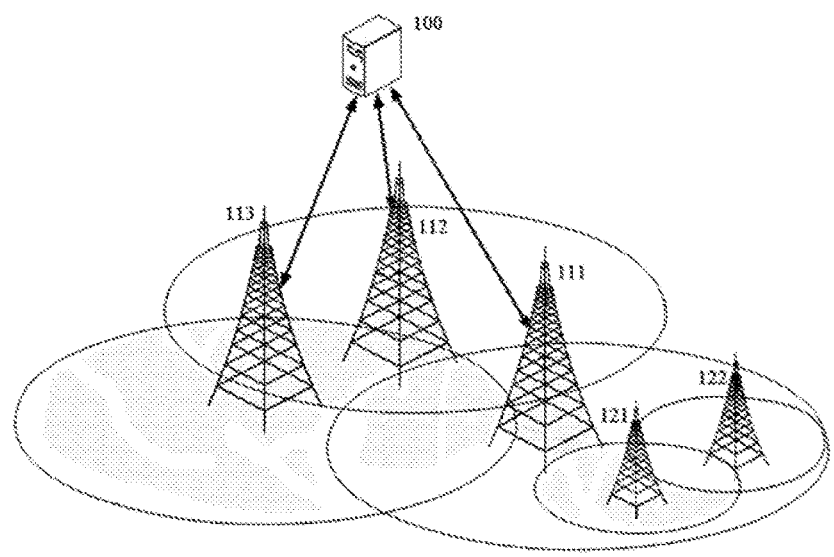
FIG. 1 is a schematic diagram illustrating a configuration of a communication system according to the present disclosure.

FIG. 1 illustrates a schematic structure of a wireless communication system according to the present disclosure. As shown in FIG. 1, the wireless communication system includes a controller 100, multiple macro base stations 111, 112 and 113 communicating with the controller 100, and multiple small base stations 121 and 122 arranged within a coverage of the specific macro base station 111. In the embodiments of the present disclosure, the multiple macro base stations 111, 112 and 113 may be operated by different operators, and may be, for example, installed on a common communication infrastructure such as an iron tower built by different operators.

The controller 100 may manage usage of unlicensed frequency bands by macro base stations 111, 112 and 113 whose coverage ranges overlap with one another, in order to avoid interference between the operators and improve a spectral efficiency. As shown in FIG. 1, the macro base stations 111, 112 and 113 have coverage ranges overlapping with one another, and it is considered in the present disclosure that the coverage ranges are similar. It should be noted that, the controller 100 according to the present disclosure is not limited to manage multiple macro base stations having coverage ranges overlapping with one another. For example, multiple macro base stations having coverage ranges which do not overlap with one another but are adjacent to one another also belong to the macro base station having similar coverage ranges, and thus the controller 100 can also manage usage for the unlicensed frequency bands of the multiple macro base stations.

Multiple controllers 100 may be distributed on iron towers (for example, one iron tower is provided with one controller 100), and connected to the macro base stations of the respective operators via specific communication interfaces. In this example, the controllers 100 can be easily configured to manage the base stations of multiple operators. In addition, in another examples, the multiple macro base stations 111, 112 and 113 are not physically arranged at a same geographical position, and the controller 100 can still centralized-arranged in a core network (for example a sever in a cloud core network). In this case, the controller 100 is connected to the macro base stations of the respective operators via, for example, an S1 interface. It should be noted that, FIG. 1 is only a schematic diagram showing the structure of the communication system, the number of the macro base stations, the number of the small base stations and deployment locations of the macro base stations and the small base stations are not limited to those shown in FIG. 1.

In a case where licensed frequency bands cannot meet communication requirements due to the increase of loads of any one or more of the macro base stations 111 to 113, the macro base station may request the controller 100 to allocate unlicensed frequency band resources. For example, in a case where a portion of transmission services of any one or more of the macro base stations 111 to 113 is adapted to be transmitted in the unlicensed frequency band resources, the macro base station may request the controller 100 to allocate the unlicensed frequency band resources, to reserve licensed frequency resources for, for example, an important service to be possibly generated. It can be understood by those skilled in the art that, the condition for requesting resources by the macro base station may not be limited thereto, which is not enumerated herein. Herein, the unlicensed frequency band resources may be wireless resources for which a cellular communication system does not have legitimate usage right, such as WiFi frequency band resources of 2.4 Ghz or 5 Ghz, broadcast television frequency band resources and frequency band resources, a usage object of which is not defined by the regulations.

When receiving a request for the unlicensed frequency band resources for the first time, the controller 100 detects interference statuses of the unlicensed frequency bands managed by the controller 100, and assigns levels to the unlicensed frequency bands based on a result of the detection. Specifically, when initially detecting the unlicensed frequency bands, the controller 100 detects interference in each of the unlicensed frequency bands based on an unlicensed frequency band list defined in different regions, and in particularly, a signal different from a signal of the cellular system (for example, the LTE system) can be considered as the interference. Generally, no LTE system signal is transmitted in the unlicensed frequency bands during the initial detecting, the controller 100 may detect the interference with for example an energy detection method. The controller 100 assigns levels to the unlicensed frequency bands based on the detected interference statuses, as shown in the following Table 1.

TABLE 1

| interference status (IN) of unlicensed frequency band | level of unlicensed frequency band |
| --- | --- |
| IN < A | Optimal |
| A < IN < B | Sub-optimal |
| B < IN < C | Good |
| C < IN | Unavailable |

In Table 1, A, B and C are predetermined thresholds meeting a relationship of A<B<C, and those skilled in the art may determine values of A, B and C based on a design requirement or an actual application. In addition, Table 1 only shows one example of the levels, and the present disclosure is not limited thereto. The levels may be set at a finer or rougher granularity by those skilled in the art according to design requirement.

The controller 100 allocates unlicensed frequency bands having certain levels to the multiple macro base stations 111 to 113 based on the determined levels in a semi-static manner.

An allocation scheme is described below. Taking the macro base station 111 as an example, the macro base station 111 obtains load status information of the small base stations 121 and 122 managed by the macro base station 111 from the small base stations 121 and 122. The load status information may be contained in, for example, X2 signaling transmitted from the small base stations 121 and 122 to the macro base station 111. Preferably, for example, load information (Load Information) in the 3GPP LTE standard may be used as the load status information. Since the unlicensed frequency band resources are generally unstable, in an example, the load status information includes the amount of load (for example, the amount of traffic load with a low quality-of-service requirement) adapted to be transmitted in the unlicensed frequency bands, so as to provide reference for allocation of the unlicensed frequency band resources and therefore to achieve reasonable allocation for the resources. In the example, a new-type of load information is provided in the present disclosure. The new-type of load information contains a load having low quality-of-service, and may further contain a traditional load. The traditional load and the load having low quality-of-service may be distinguished by, for example, an identity bit (flag).

Based on the above example, the macro base station 111 determines the sum of traffic loads with the low quality-of-service (QoS) requirement and the sum of total loads, of the small base stations 121 and 122 based on the obtained load status information. The macro base stations 112 and 113 may perform processing similar to the processing of the macro base station 11, that is, obtaining the sum of traffic loads with the low QoS requirement and the sum of total loads, of small base stations managed by each of the macro base stations 112 and 113. Then, the macro base stations 111, 112 and 113 respectively report the determined sum of traffic loads with the low QoS requirement and the determined sum of total loads to the controller 100. The controller 100 generates the unlicensed frequency band allocation information based on the acquired traffic load statuses of the macro base stations, to allocate the unlicensed frequency bands to the macro base stations in a mutually exclusive manner. In the following, Table 2 shows an exemplary scheme of allocating the unlicensed frequency bands having appropriate levels to the macro base stations in the mutually exclusive manner.

TABLE 2

| sum of traffic loads with low QoS requirement adapted to LAA transmission | sum of total loads | allocation of frequency band |
| --- | --- | --- |
| >threshold d | >threshold D | the optimal unlicensed frequency band is allocated to the macro base station |
| >threshold d | <threshold D | the sub-optimal unlicensed frequency band is allocated to the macro base station |
| <threshold d | >threshold D | the good unlicensed frequency band is allocated to the macro base station |
| <threshold d | <threshold D | the unlicensed frequency band which has not been allocated, if there is any, is allocated to the macro base station; otherwise, the unlicensed frequency band may not be allocated to the macro base station |

Values of the thresholds d and D may be determined by those skilled in the art based on a design requirement or an actual application. It can be seen from Table 2 that, generally, an unlicensed frequency band having the optimal level is allocated to a macro base station having a heavy load, to ensure a communication quality of the macro base station. In addition, in a case that both the traffic load with the low QoS requirement and the total load are considered, an unlicensed frequency band having the optimal level is preferably allocated to a macro base station having a heavy traffic load with low QoS requirement. It should be noted that, Table 2 is only a schematic diagram of an allocation method which is used to clarify the principle of the present disclosure, but is not intended to limit the scope of the present disclosure. For example, the traffic load with the low QoS requirement may not be contained in the load status information. In this case, the controller 100 may allocate the unlicensed frequency bands based on a descending order of the amount of the total loads.

In an example of the present disclosure, the unlicensed frequency band resource allocated to the macro base station by the controller 100 corresponds to a usage time period. After the usage time period expires, the macro base station needs to re-determine whether the condition for requesting the unlicensed frequency bands is met, and re-transmit a request to acquire new resource. In another example of the present disclosure, the controller 100, for example, periodically acquires load status information of the macro base station which requests for the resources, alternatively, the macro base station which requests for the resources periodically transmits load status information thereof. In this way, in a case that an unlicensed frequency band is allocated to a certain macro base station by the controller 100, and the macro base station no longer needs the unlicensed frequency band resource due to the reduce of the load, the controller 100 may disable usage for the unlicensed frequency band of the certain macro base station. After that, if, for example, another macro base station requests for an unlicensed frequency band, the controller 100 needs to detect an unlicensed frequency band which is not allocated currently. For example, as described above, interference status of the unlicensed frequency band can be detected with an energy detection method and the like. In addition, in some examples of the present disclosure, the controller 100 periodically or non-periodically disables or enables the allocation of unlicensed frequency bands. And when the allocation of unlicensed frequency bands is enabled, the detecting is performed, for example, the detecting may be considered as an initial detecting. The controller 100 periodically or non-periodically disables and enables the allocation of unlicensed frequency bands in the following manners. In a case that no base station requests for an unlicensed frequency band in a predetermined time period, the controller 100 enters into sleep state (it may be considered that the allocation of unlicensed frequency bands is disabled), and enables the allocation of unlicensed frequency bands and re-detects the unlicensed frequency bands after being in the sleep state for a predetermined time period, to save energy. Alternatively, an operation period of the controller 100 may be set for a deployment environment. For example, in a scenario of dense office buildings, the controller 100 only operates in daytime to allocate the unlicensed frequency bands, while entering into the sleep state in night.

As described above, the controller 100 allocates the unlicensed frequency bands having appropriate levels to the multiple macro base station 111 to 113 in a dynamic or semi-static manner. Each of the small base stations managed by each of the above macro base stations may access to a specific unlicensed frequency band among the unlicensed frequency bands exclusively occupied by the macro base station, and communicates with a user equipment in the specific unlicensed frequency band. In a preferable example of the present disclosure, the interference status detected by the controller 100 may be not consistent with an interference status in an actual operation of the cellular system. Besides, interference may exist due to frequency spectrum leakage between adjacent frequency bands even if the unlicensed frequency bands are allocated to multiple operators in the mutually exclusively manner. Therefore, the controller 100 may adopt a medium-term detection mechanism to improve the accuracy of the allocation. In this case, since the unlicensed frequency bands are allocated and used, the controller 100 may determine (such as correct or adjust) a level of the unlicensed frequency band based on an actual signal to interference and noise ratio (SINR) in the unlicensed frequency band.

Specifically, for example, the small base station 121 acquires SINRs on specific unlicensed frequency bands used by all user equipments communicating with the small base station 121 from the user equipments, and averages SINRs fed back by the user equipments and transmits an average value of the SINRs to the macro base station 111 to which the small base station 121 belongs. Then, the macro base station 111 averages the average values of SINRs reported by the small base stations 121 and 122 managed by the macro base station 111, and reports to the controller 100. The macro base stations 112 and 113 may perform similar processing. Therefore, the controller 100 may obtain interference statuses (represented by SINR) of the unlicensed frequency bands allocated to the macro base stations 111 to 113, and re-assign levels to the unlicensed frequency bands based on SINR, for example, based on SINR measured for a time period, as shown in the following Table 3.

TABLE 3

| interference status (SINR) of unlicensed frequency band | level of unlicensed frequency band |
| --- | --- |
| SINR > a | optimal |
| a > SINR > b | sub-optimal |
| b > SINR > c | good |
| SINR < c | unavailable |

In Table 3, a, b and c are predetermined thresholds which meet a relationship of a>b>c, and those skilled in the art may determine values of a, b and c based on a design requirement or an actual application. Similar to Table 1, Table 3 only shows one example of the levels, and the present disclosure is not limited to the levels shown in Table 3.

Next, based on the re-assigned levels and the allocation mechanism shown in Table 2, the controller 100 reallocates unlicensed frequency bands having appropriate levels to the macro base stations 111 to 113 when, for example, the macro base stations request for the unlicensed frequency bands again.

With the semi-static frequency allocation mechanism described above, based on the interference statuses (such as SINR) obtained by the macro base stations under different operators and load statuses of the macro base stations, unlicensed frequency bands having different levels may be allocated to the macro base stations, thereby ensuring fairness in sharing the unlicensed frequency bands between the macro base stations under different operators.

Alternatively, the controller may allocate the unlicensed frequency bands to the macro base stations under different operators in a time division manner. That is to say, the controller allocates all frequency bands in an unlicensed frequency spectrum to a macro base station under a certain operator at a certain time instant, and allocates the all frequency bands to a macro base station under another operator after a certain time period passes. In this way, the macro base stations under different operators may occupy all the unlicensed frequency bands in the time-division manner, thereby reducing interference between the macro base stations and ensuring the fairness.

In an example of the present disclosure, the controller 100 communicates with the macro base stations 111 to 113 via an S1 interface, to allocate unlicensed frequency bands to the macro base stations 111 to 113. Taking the macro base station 111 as an example, firstly, the controller 100 transmits an evolution radio access bearing (E-RAB) setup request to the macro base station 111, and then the macro base station 111 replies an E-RAB setup response to the controller 100. The E-RAB setup response transmitted by the macro base station additionally contains two information bits for notifying the controller of the load status of the macro base station 111. For example, a first information bit may indicate a traffic load with a low QoS requirement which is suitable to be transmitted in LAA, while a second information bit may indicate a total load. It is represented that the load exceeds a predetermined threshold if the value of the information bit is "0", and it is represented that the load does not exceed the predetermined threshold if the value of the information bit is "1". It can be understood by those skilled in the art that, different number of information bits may be set based on a granularity for classifying the load level. In this way, the controller 100 may obtain the load status of the macro base station 111 based on the response signal transmitted by the macro base station 111, and then, for example, the controller 100 may contain a list of to-be-allocated frequency bands in S1 signaling and transmit the list of frequency bands to the macro base station 111 with the S1 signaling, so as to allocate unlicensed frequency bands having appropriate levels to the macro base station 111. In this case, the above Table 2 may be modified as the following Table 4.

TABLE 4

| information bits in E-RAB setup response | allocation of frequency band |
| --- | --- |
| 00 | the optimal unlicensed frequency band is allocated to the macro base station |
| 01 | the sub-optimal unlicensed frequency band is allocated to the macro base station |
| 10 | the good unlicensed frequency band is allocated to the macro base station |
| 11 | unlicensed frequency band which has not been allocated, if there is any, is allocated to the macro base station; otherwise, unlicensed frequency band may not be allocated to the macro base station |

The processing of allocating the unlicensed frequency bands to the macro base stations 111 to 113 by the controller 100 is described above. A process that a small base station managed by a macro base station accesses to the unlicensed frequency bands exclusively occupied by the macro base station after the macro base station acquires the exclusively occupied unlicensed frequency bands is described below.

When communicating with a user equipment in a specific unlicensed frequency band, a small base station may suffer from interference from other small base stations (other small base stations other than the small base station serving the user equipment) under a same operator and interference from other systems (such as a WiFi system and a radar system) (that is, the unlicensed frequency bands may still be occupied by other systems randomly although the controller performs preliminary detection and classification). Therefore, it should be considered to avoid interference between the small base station and other systems when the small base station accesses to the unlicensed frequency bands exclusively occupied by the macro base station. For example, for the WiFi system, unlicensed frequency band status information (UBSI) and a random backoff mechanism are proposed in the present disclosure to reduce interference between the small base station and the WiFi system. For a radar system, an enhanced dynamic frequency selection (DFS) mechanism is proposed in the present disclosure to avoid interference between the small base station and the radar system. It should be noted that, the interference avoidance for the WiFi system or the radar system may be alternative. For example, the macro base station may determine whether to adopt the interference avoidance solution for the radar system by determined whether an allocated exclusively-occupied unlicensed frequency band is a frequency band in which the radar system may operate.

Figure 2:
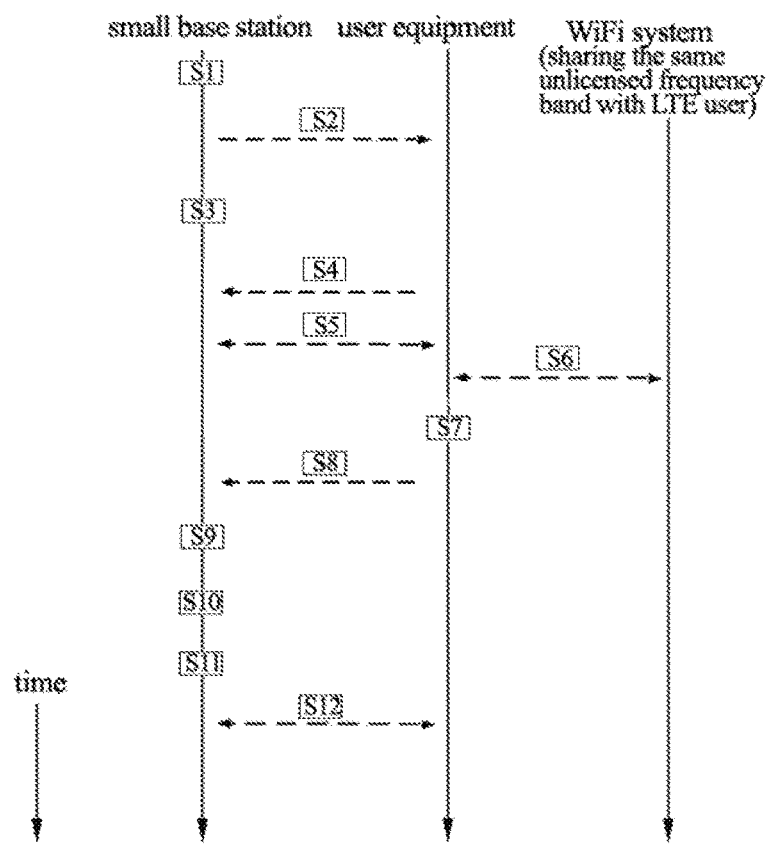
FIG. 2 is a signaling flowchart of processing in a case that there is interference from a WiFi system.
Figure 3:
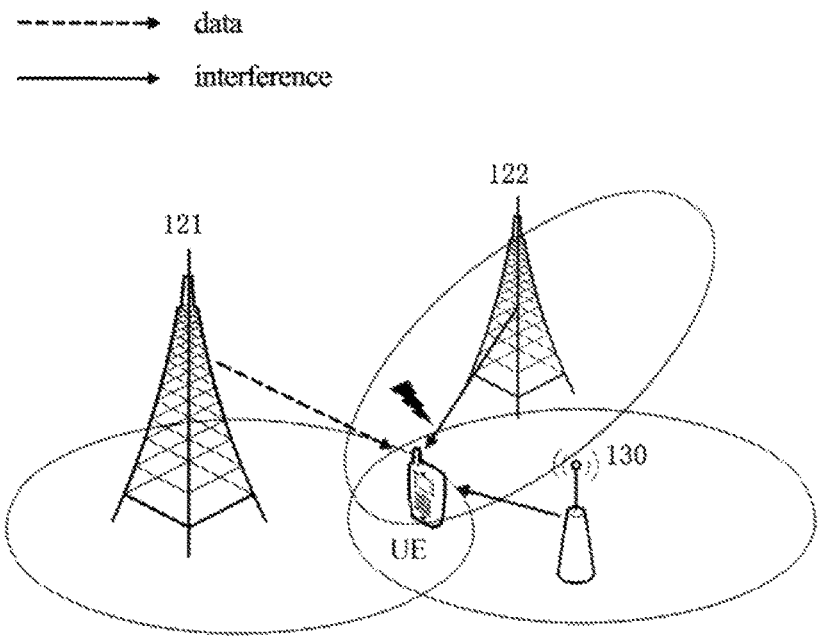
FIG. 3 illustrates an exemplary scenario in which there is interference from other small stations and a WiFi system.

Firstly, processing in a case that there is the interference from the WiFi system is described by referring to FIGS. 2 and 3. FIG. 2 shows a signaling flow of the processing, and FIG. 3 schematically shows a scenario where interference comes from other small base stations and the WiFi system.

Taking the macro base station 111 as an example, the macro base station 111 determines unlicensed frequency bands exclusively occupied thereby among unlicensed frequency band resources based on the unlicensed frequency band allocation information from the controller 100. Then, the macro base station 111 generates X2 signaling containing information indicative of the exclusively occupied unlicensed frequency bands, and notifies the exclusively occupied unlicensed frequency bands to the small base stations 121 and 122 within the coverage of the macro base station 111 via an X2 interface.

Each of the small base stations 121 and 122 determines accessible unlicensed frequency bands based on the information indicating the exclusively occupied unlicensed frequency bands transmitted by the macro base station 111, detect statuses of the accessible unlicensed frequency bands and dynamically access to a specific unlicensed frequency band among the accessible unlicensed frequency bands based on a result of the detection. In the following, the accessing process of the small base stations 121 and 122 are described.

In step S1 in FIG. 2, each of the small base stations 121 and 122 (for simplicity, the small base station 121 is taken as an example for description hereinafter) detects signal energy on all channels of the exclusively occupied unlicensed frequency bands. If one or more channels having signal energy lower than a predetermined threshold are detected, the small base station 121 selects a channel having lowest signal energy among these channels, and prepares to access to the selected channel to communicate with the user equipment. If the small base station 121 detects that the signal energy on all the channels is higher than the predetermined threshold, the small base station 121 continues detecting whether an LTE signal exists on each of the channels. In an aspect, in the case that the LTE signal exists on each of the channels (it means that the channels are used by other small base stations), the small base station 121 selects a channel having a greatest SINR value and prepares to access to the selected channel. That is to say, the small base station 121 shares the channel with other small base station which has accessed to the channel previously. In another aspect, if there is no channel on which a LTE signal exists, and since it is determined above that the signal energy on the channels is higher than the predetermined threshold, a signal other than the LTE signal, such as a WiFi signal and a radar signal, generally exists on the channel. In this case, the small base station 121 abandons the channels and re-detects another channel.

In step S2, in the case that a specific channel is selected by the small base station 121, information on the channel is contained in downlink control information (DCI) of a physical downlink control channel (PDCCH), or in RRC signaling on a physical downlink shared channel (PDSCH) or in broadcast information on a broadcast control channel (BCCH) in for example an licensed frequency band, to transmit the information on the channel to the user equipment. Moreover, in a preferable example of the present disclosure, the accessing process further includes step S3. In step S3, the small base station 121 transmits a discovery reference signal (DRS) on the selected channel. In this way, the WiFi system may be prevented from occupying the channel, and the user equipment may perform coarse synchronization on the channel. It should be noted that, the DRS is generally used for discovery of a sleeping small cell, and is generally transmitted by the sleeping small cell. Transmission features of the DRS are utilized in the present disclosure, such as a short transmission period and including a synchronization signal. In the present disclosure, the DRS is transmitted by an active small base station, to prevent the WiFi system from rapidly occupying the channel and to be used for the coarse synchronization of the user equipment. After receiving the information on the selected channel from the small base station 121, the user equipment detects whether interference exists on the channel. In step S4, unlicensed frequency band status information (UBSI) is fed back with, for example, uplink control information (UCI) on a physical uplink control channel (PUCCH) or RRC signaling on a physical uplink shared channel (PUSCH), in the licensed frequency bands. Particularly, if it is determined that no harmful interference exists, UBSI with a value of "0" is fed back. The UBSI is described in detail below. Then in step S5, the user equipment and the small base station 121 transmit and receive data on the channel carried in the unlicensed frequency band.

As shown in FIG. 3, in a process of communicating with the user equipment (UE) the small base station 121 may suffer from interference from another small base station 122 sharing the channel with the small base station 121, and may also suffer from interference from a WiFi access point 130 (step S6 in FIG. 2). Therefore, the user equipment persists in detecting an SINR value on the used channel during the communication process (step S7 in FIG. 2). In an aspect, if the SINR value on the channel is less than a predetermined value, the user equipment determines that there is an interference source (for example, the WiFi access point 130) around. In this case, in step S8, the user equipment transmits UBSI with a value of "1" to the small base station 121 via, for example, the physical uplink control channel (PUCCH) in the licensed frequency bands. Upon receiving the UBSI with the value of "1", the small base station 121 may reselect and re-access to another channel to communicate with the user equipment (step S9 in FIG. 2). The process of re-selecting and accessing is described in detail hereinafter. In another aspect, if the SINR value on the channel is greater than the predetermined threshold, it means that the communication channel is in good status and can be continued being used. In this case, the user equipment feeds back UBSI with a value of "0" to the small base station 121. Values and meanings corresponding to the values of the UBSI are shown in the following Table 5.

| unlicensed frequency band status information (UBSI) | meaning |
|---|---|
| 0 | SINR value of the channel is greater than a threshold. It is possible to continue to use the channel. |
| 1 | SINR value of the channel is lower than a threshold. It is necessary to change the channel. |

A process of reselecting and accessing to another channel by the small base station 121 is described in detail below. In the process of accessing to another channel due to interference (such as interference from the WiFi access point 130), a random backoff mechanism is adopted by the small base station 121 if another available channel (as described above, a channel having lowest signal energy or a channel having a greatest SINR value) is detected by the small base station 121, to reduce a probability of conflicting with the WiFi system again. Specifically, after monitoring the available channel for a certain time period (channel monitoring time period), the small base station 121 waits for a random backoff time period (step S10 in FIG. 2) which may be a random value in a certain range (for example, 32 us). If no device accesses to the channel within the backoff time period, the small base station 121 close the original communication channel (step S11 in FIG. 2) and communicates with the user equipment in the re-selected channel (step S12 in FIG. 2).

Figure 4A:
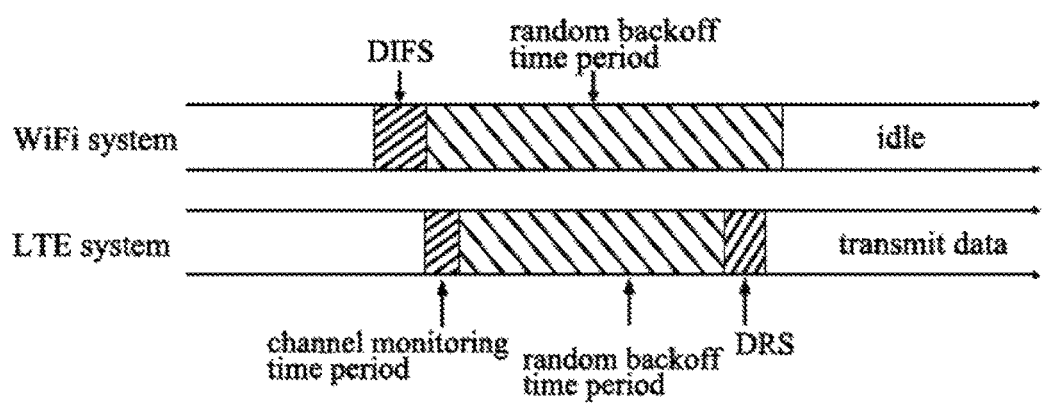
FIGS. 4A and 4B illustrate a random backoff mechanism.
Figure 4B:
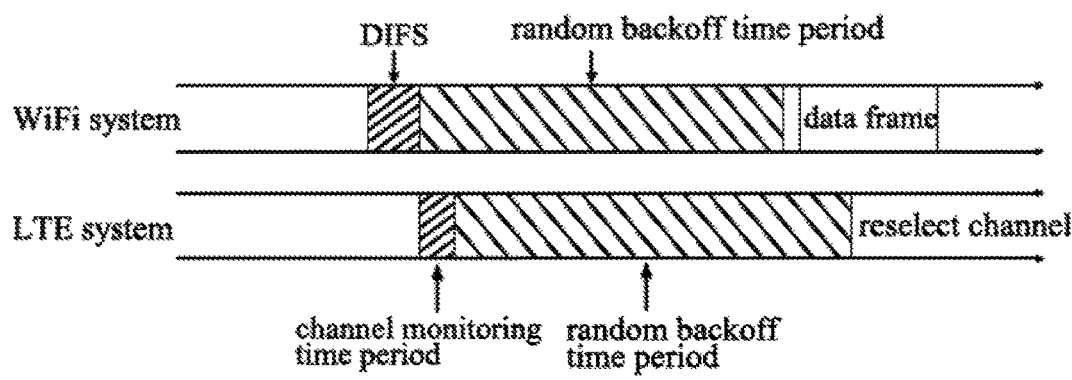

FIGS. 4A and 4B shows the random backoff mechanism in detail. As shown in FIG. 4A, if a WiFi system accesses to the channel within the backoff time period, the small base station 121 continues detecting other available channels instead of accessing to the channel.

Otherwise, as shown in FIG. 4B, if no WiFi system accesses to the channel within the backoff time period, the small base station 121 may transmit a DRS on the channel after the backoff time period and transmits information on the channel to the user equipment in an licensed frequency band. Then, the small base station 121 may communicate with the user equipment on the channel.

By adopting the random backoff mechanism, it can ensure both efficiency and fairness in occupying the unlicensed frequency bands by the LTE system and WiFi system.

The processing in the case that there is interference from WiFi system is described above, and interference avoidance processing for the radar system is described below. In this aspect, an enhanced dynamic frequency selection (DFS) mechanism is provided in the present disclosure.

The DFS mechanism allows a device to share frequency spectrum with a radar system. According to the DFS mechanism, before occupying the channel, the device monitors whether a radar signal exists on the channel in a time period. The time period for the monitoring is generally not shorter than 60 s. In this case, if a small base station monitors the radar signal before accessing to the channel, a time period for the monitoring is at least 60 s, which reduces access efficiency. Therefore, in another embodiment according to the present disclosure, before notifying the small base station 121 or 122 within the coverage range of the macro base station 111 of the unlicensed frequency bands exclusively occupied by the macro base station 111, the macro base station 111 performs channel estimation on the exclusively occupied unlicensed frequency bands, that is, the macro base station 111 detects whether a radar signal exists in the exclusively occupied unlicensed frequency bands, and the macro base station 111 then generates a "whitelist" list containing available channels on which no radar signal exists based on a result of the detection. The macro base station 111 transmits the "whitelist" list to the small base station 121 or 122 via a backhaul link or an X2 interface. In this way, when trying to access to a certain channel in the list, the small base station 121 or 122 only monitors the channel for a relative shorter time period (such as 20 us), without monitoring the radar signal for a long time period, thereby improving the access efficiency.

In a case that the small base station 121 or 122 accesses to a certain channel and communicates with a user equipment on the channel, the small base station 121 or 122 periodically detects radar interference status on the channel. If interference from the radar system is detected by the small base station 121 or 122 on the communication channel, or as described above, if the user equipment feeds back UBSI with a value of "1" (it means that the SINR value on the channel is small), the small base station 121 or 122 needs to re-select and access to another channel for communication.

In addition, the small base station 121 or 122 periodically detects the radar interference status and feeds back radar signal indication information (RSII) to the macro base station 111. Values of RSII and meanings corresponding to the values are shown in the following Table 6.

TABLE 6

| Radar Signal Indication Information (RSII) | meaning |
|---|---|
| 0 | No radar interference signal is defected on the channel. It is possible to continue to use the channel. |
| 1 | Radar interference signal is detected on the channel The macro base station is requested to remove the channel from the "whitelist". |

Assuming that interference from the radar system is detected by the small base station 121 on the communication channel, the small base station 121 feeds back information on the channel and RSII with a value of "1" to the macro base station 111. Then, the macro base station 111 removes the channel from the "whitelist" list and transmits an updated "whitelist" list to the small base stations 121 and 122 via the backhaul link/X2 interface.

It should be noted that, in the case that no radar signal is detected, the small base station feeds back RSII with a value of "0" periodically, and the small base station immediately feeds back RSII with the value of "1" to the macro base station once a radar signal is detected by the small base station.

It should be noted that, after removing the channel from the "whitelist" list, the macro base station 111 monitors a radar signal on the channel again after a certain time period (such as 30 minutes). If no radar signal is detected within the time period (such as 60 s) for monitoring, the macro base station 111 may add the channel into the "whitelist" list again.

Figure 5:
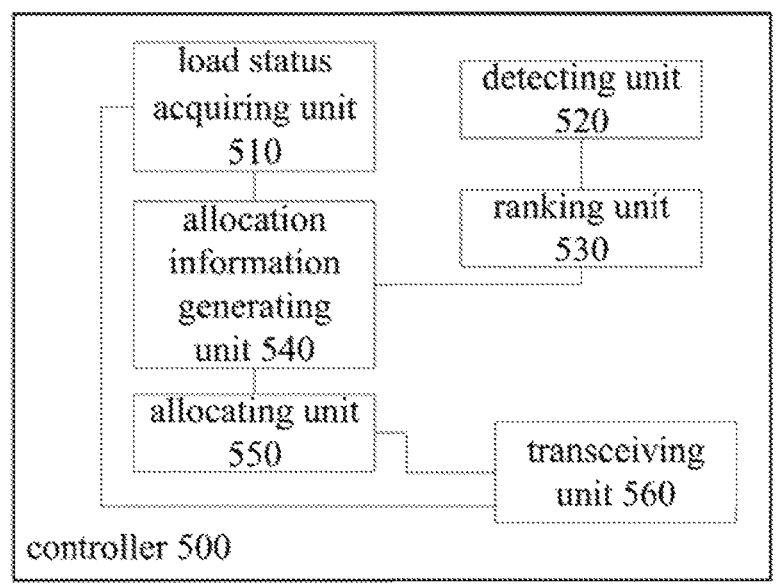
FIG. 5 is a diagram showing functional modules of a controller according to the present disclosure.
Figure 6:
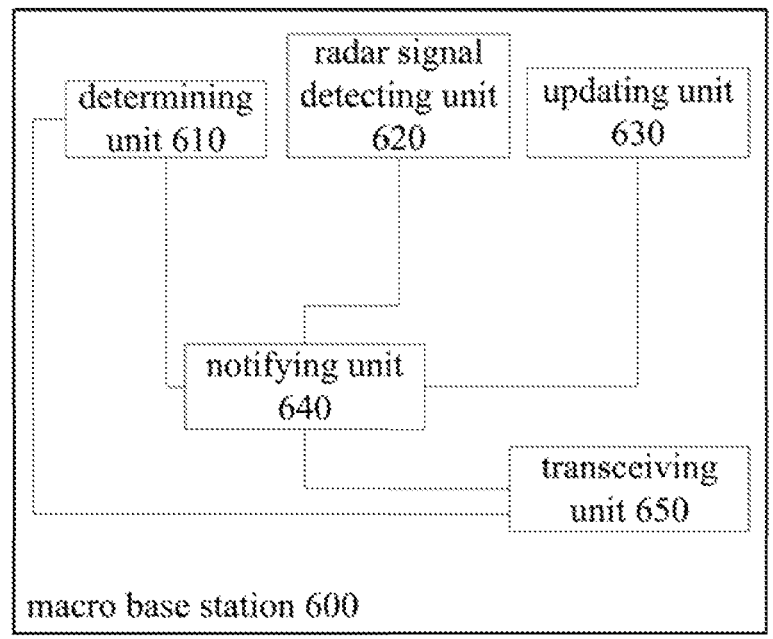
FIG. 6 is a diagram showing functional modules of a macro base station according to the present disclosure.
Figure 7:
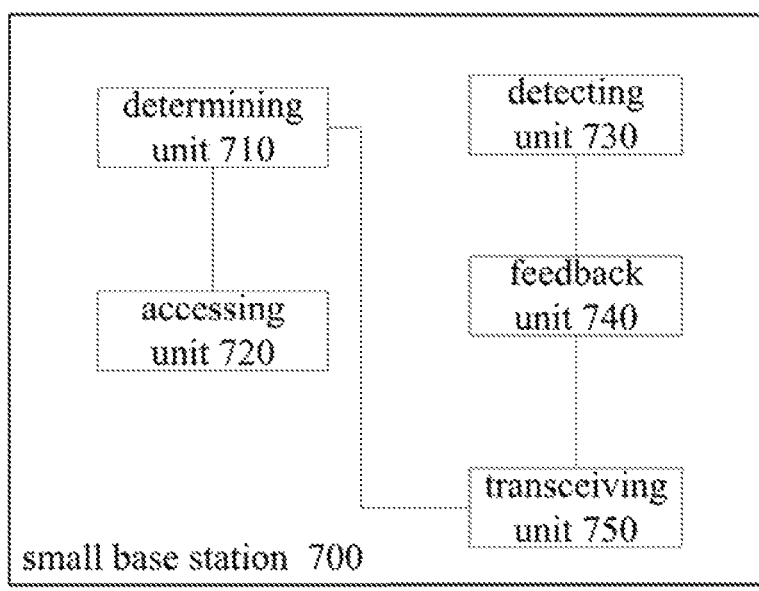
FIG. 7 is a diagram showing functional modules of a small base station according to the present disclosure.

FIG. 5, FIG. 6 and FIG. 7 are diagrams showing functional modules of a controller, a macro base station and a small base station according to the present disclosure. As shown in FIG. 5, a controller 500 according to the present disclosure may include a load status acquiring unit 510, a detecting unit 520, a ranking unit 530, an allocation information generating unit 540, an allocating unit 550 and a transceiving unit 560.

The load status acquiring unit 510 is configured to acquire traffic load status of each of macro base stations managed by the controller 500, such as the sum of traffic loads with a low QoS requirement and the sum of total loads both of which are reported by the macro base stations, as described above.

The detecting unit 520 is configured to detect interference statuses of unlicensed frequency bands managed by the controller 500. As described above, for example, an energy detection method may be adopted in initial detecting, and an SINR value may be detected in a medium-term detection. Then, the ranking unit 530 is configured to rank the unlicensed frequency bands based on a result of the detection, as shown in Tables 1 and 3.

The allocation information generating unit 540 is configured to generate unlicensed frequency band allocation information based on the acquired traffic load statuses of the macro base stations. The unlicensed frequency band allocation information indicates to allocate an unlicensed frequency band having an appropriate level to a macro base station having an appropriate amount of load, as shown in Table 2. Then, the allocating unit 550 allocates the unlicensed frequency bands to the macro base stations in a mutually exclusive manner based on the unlicensed frequency band allocation information.

The controller 500 communicates with the macro base stations via the transceiving unit 560, and particularly, the transceiving unit 560 communicates with the macro base stations via an S1 interface.

As shown in FIG. 6, a macro base station 600 according to the present disclosure may include a determining unit 610, a radar signal detecting unit 620, an updating unit 630, a notifying unit 640 and a transceiving unit 650.

In an embodiment, the determining unit 610 is configured to determine unlicensed frequency bands exclusively occupied by the macro base station 600 based on the unlicensed frequency band allocation information from the controller. The notifying unit 640 is configured to notify small base stations managed by the macro base station 600 of the unlicensed frequency bands exclusively occupied.

In another embodiment, the radar signal detecting unit 620 is configured to detect a radar signal on the exclusively occupied unlicensed frequency bands determined by the determining unit 610, and generate a "whitelist" list containing available channels on which no radar signal exists based on a result of the detection. The notifying unit 640 is configured to notify the small base stations managed by the macro base station 600 of the "whitelist" list.

In addition, each of the small base stations feeds back information indicating whether radar interference exists on a communication channel to the macro base station 600. In a case that the information fed back by the small base station indicates that the radar interference exists on a specific channel, the updating unit 630 of the macro base station 600 is configured to remove the channel from the "whitelist" list, and the notifying unit 640 is further configured to notify the small base stations of the updated "whitelist" list.

The macro base station 600 communicates with the controller and the small base stations via the transceiving unit 650. Particularly, the macro base station 600 notifies the small base stations of the unlicensed frequency bands exclusively occupied by the macro base station 600 or the "whitelist" list via a backhaul link.

As shown in FIG. 7, a small base station 700 according to the present disclosure may include a determining unit 710, an accessing unit 720, a detecting unit 730, a feedback unit 740 and a transceiving unit 750.

The determining unit 710 is configured to determine an accessible unlicensed frequency band for the small base station 700 based on the indication information from the macro base station. The accessing unit 720 is configured to detect channels in the unlicensed frequency band and select a certain channel to access. In a case that a specific channel is selected, the accessing unit 720 is configured to transmit information on the channel to a user equipment on a PDCCH in an licensed frequency band and transmit a DRS on the specific channel, thereby accessing to the channel.

In a case that the small base station 700 accesses to the specific channel and communicates with the user equipment on the channel, the detecting unit 730 is configured to periodically detect radar interference status on the channel, and the feedback unit 740 is configured to feedback the detected radar interference status to the macro base station.

In a case where the detecting unit 730 detects that a radar interference signal occurs on the channel, the accessing unit 720 is configured to select another channel to access. Alternatively, in a case where an SINR value fed back from the user equipment indicates that communication quality on the channel reduces, the accessing unit 720 is configured to select another channel to access.

The small base station 700 communicates with the macro base station via the transceiving unit 750, and particularly, the transceiving unit 750 communicates with the macro base station via an X2 interface.

It should be noted that, the various devices or modules described herein may be only logical and do not strictly correspond to physical devices or assemblies. For example, a function of each of the modules described herein can be implemented by multiple physical entities, or, functions of multiple modules described herein may be implemented by a single physical entity.

A series of processing performed by each device or module in the above embodiments may be implemented with software, hardware or a combination thereof. Programs included in the software may be stored in, for example, a memory medium arranged inside or outside the device or assembly in advance. As an example, during execution, the programs are written into a random access memory (RAM) and are executed by a processor (such as CPU).

Figure 8:
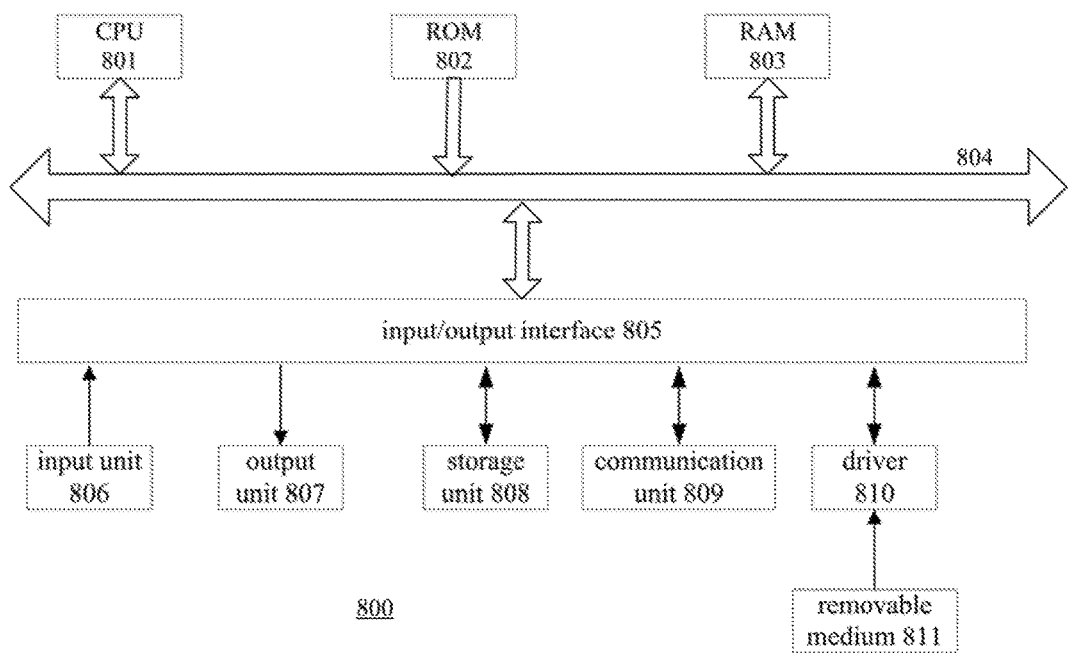
FIG. 8 is a block diagram illustrating an exemplary configuration of computer hardware.

FIG. 8 is a block diagram of an exemplary configuration of computer hardware for executing the processing according to the present disclosure based on programs.

In a computer, a central processing unit (CPU) 801, a read-only memory (ROM) 802 and a random access memory (RAM) 803 are connected to one another via a bus 804.

An input/output interface 805 is further connected to the bus 804. The following components are connected to the input/output interface 805: an input unit 806 in a form of a keyboard, a mouse, a microphone and the like; an output unit 807 in a form of a display, a loudspeaker and the like; a storage unit 808 in a form of a hard disc, a non-volatile memory and the like; a communication unit 809 in a form of a network interface card (such as a Local area network (LAN) card and a modem); and a driver 810 for driving a removable medium 811 such as a magnetic disc, an optical disc, a magnetic optical disc or a semiconductor memory.

In the computer having the above structure, the CPU 801 loads the programs stored in the storage unit 808 to the RAM 803 via the input/output interface 805 and the bus 804, and executes the programs to perform the above series of processing.

The programs to be executed by the computer (CPU 801) may be recorded on the removable medium 811 as a package medium in a form of, for example, a magnetic disc (including a floppy disc), a compact disc (including compact disc read-only memory (CD-ROM), digital versatile disc (DVD) and the like), a magneto optical disc or a semiconductor memory. Alternatively, the programs to be executed by the computer (CPU 801) may also be provided via a wired or wireless transmission medium such as LAN, the Internet or digital satellite broadcasting.

In a case that the removable medium 811 is mounted in the driver 810, the programs may be loaded into the storage unit 808 via the input/output interface 805. In addition, the programs may be received by the communication unit 809 via a wired or wireless transmission medium, and are loaded in the storage unit 808. Alternatively, the programs can be previously loaded into the ROM 802 or the storage unit 808.

The programs to be executed by the computer may execute the processing in a sequence as described in the specification, or, may execute the processing in parallel or execute the processing when necessary (e.g., when being called).

APPLICATION EXAMPLES

The technology according to the present disclosure can be applied in various products. For example, the controller 100 may be implemented as any type of server, such as a tower server, a rack mounted server and a blade server. Alternatively, the controller 100 may be a control module (such as an integrated circuit module including a single wafer, and a card or blade (blade) inserted into a slot of the blade server) mounted on a server.

For example, a base station (including the macro base station and the small base station described above) can be implemented as any type of evolved node B (eNB), such as a macro eNB and a small eNB. The small eNB such as a pico eNB, micro eNB and a home (femto-cell) eNB may have a smaller coverage range than a macro cell. Alternatively, the base station may also be implemented as any other type of base stations, such as a NodeB and a base transceiver station (BTS). The base station may include a body (also referred to as a base station device) configured to control wireless communication; and one or more remote radio heads (RRHs) arranged in a different position from the body. In addition, various types of user equipment described below may operate as a base station by temporarily or semi-persistently executing the function of the base station.

For example, the user equipment can be implemented as a mobile terminal (such as a smart phone, a panel personnel computer (PC), a notebook PC, a portable game terminal, a portable/dongle mobile router and a digital camera) or an on-vehicle terminal (such as an automobile navigation device). The user equipment may be implemented as a terminal performing machine-to-machine (M2M) communication, which is also referred as a machine-type communication (MTC) terminal. In addition, the user equipment may be a wireless communication module (such as an integrated circuit module including a single wafer) mounted on each of the terminals described above.

In the above, the embodiments and technical effects of the present disclosure are described in detail in conjunction with the drawings, however, the scope of the present disclosure is not limited thereto. It should be understood by those skilled in the art that, various modifications or changes can be made to the embodiments discussed herein without departing from the principle and spirit of the present disclosure, depending on design requirements and other factors. The scope of the present disclosure is defined by the appended claims or equivalents thereof.

In addition, the present disclosure may be configured as follows.

A controller in a communication system includes one or more processors configured to: acquire traffic load statuses of multiple macro base stations having similar coverage; and generate unlicensed frequency band allocation information based on the traffic load statuses, to allocate unlicensed frequency bands to the multiple macro base stations in a mutually exclusive manner, wherein the multiple macro base stations are operated by different operators.

The one or more processors are further configured to: detect statuses of the unlicensed frequency bands, rank the unlicensed frequency bands based on a result of the detection, and allocate the unlicensed frequency bands to the multiple macro base stations in a mutually exclusive manner based on the ranks.

The status of the unlicensed frequency band includes interference status or signal to interference and noise ratio (SINR) of the unlicensed frequency band.

The one or more processors are further configured to: acquire status of traffic load with low quality-of-service (QoS) requirement of the multiple macro base stations; and allocate the unlicensed frequency bands based on the status of the traffic load with low QoS requirement, wherein the unlicensed frequency band having a higher rank is allocated to the macro base station of which the traffic load with low QoS requirement is heavier.

The controller further includes a transceiving unit configured to acquire the status of the traffic load with low QoS requirement from the multiple macro base stations and allocate the unlicensed frequency bands to the macro base stations, via an S1 interface.

A device at a macro base station side in a communication system includes one or more processors configured to: acquire unlicensed frequency band allocation information from a controller in the communication system, to determine unlicensed frequency bands exclusively occupied by the macro base station among unlicensed frequency band resources; and generate information indicating the unlicensed frequency bands exclusively occupied by the macro base station, and notify one or more small base stations within a coverage of the macro base station of the unlicensed frequency bands exclusively occupied.

The one or more processors are further configured to detect a radar signal for the unlicensed frequency bands exclusively occupied, and notify the small base stations of information indicating available unlicensed frequency bands on which no radar signal exists among the unlicensed frequency bands exclusively occupied.

The one or more processors are further configured to update the available unlicensed frequency bands based on feedback information from the small base stations.

The device at the macro base station side operates as the macro base station, and further includes a transceiving unit configured to transmit the information indicating the unlicensed frequency bands exclusively occupied by the macro base station or the information indicating the available unlicensed frequency bands to the small base stations via an X2 interface.

A device at a small base station side in a communication system includes one or more processors configured to: determine accessible unlicensed frequency bands for the small base station based on information which is transmitted from a macro base station managing the small base station and which indicates unlicensed frequency bands exclusively occupied by the macro base station or available unlicensed frequency bands; and detect statuses of the accessible unlicensed frequency bands, and dynamically access to a specific unlicensed frequency band among the accessible unlicensed frequency bands based on a result of the detection.

The one or more processors are further configured to, in a case where the specific unlicensed frequency band is detected to be idle, generate a discovery reference signal, and map the discovery reference signal onto the specific unlicensed frequency band for transmission.

The one or more processors are further configured to, in a case where the specific unlicensed frequency band is detected to be idle, generate downlink control information containing information indicative of the specific unlicensed frequency band, and map the downlink control information onto licensed frequency band to transmit to a user equipment managed by the small base station.

The one or more processors are further configured to determine whether to access to another unlicensed frequency band other than the accessed specific unlicensed frequency band based on unlicensed frequency band status information transmitted from the user equipment.

The one or more processors are further configured to: periodically detect channel status of the accessed specific unlicensed frequency band, and feed back the detected channel status to the macro base station; and determine whether to access to another unlicensed frequency band other than the accessed specific unlicensed frequency band based on the channel status.

The channel status indicates radar interference on the accessed specific unlicensed frequency band.

The device at the small base station side operates as the small base station and further includes a transceiving unit configured to receive, from the macro base station via an X2 interface, the information indicating the unlicensed frequency bands exclusively occupied by the macro base station or the information indicating the available unlicensed frequency bands.

A frequency allocation method for unlicensed frequency bands includes: acquiring, by a controller, traffic load statuses of multiple macro base stations having similar coverage, and generating, by a controller, unlicensed frequency band allocation information based on the traffic load statuses, to allocate the unlicensed frequency bands to the multiple macro base stations in a mutually exclusive manner, where the multiple macro base stations are operated by different operators; receiving, by the macro base station, the unlicensed frequency band allocation information from the controller to determine unlicensed frequency bands exclusively occupied by the macro base station among unlicensed frequency band resources, and generating, by the macro base station, information indicating the unlicensed frequency bands exclusively occupied by the macro base station; and receiving, by a small base station, the information indicating the unlicensed frequency bands exclusively occupied by the macro base station from the macro base station, detecting, by a small base station, statuses of the unlicensed frequency bands exclusively occupied by the macro base station, and dynamically accessing, by the small base station, to a specific unlicensed frequency band among the unlicensed frequency bands exclusively occupied by the macro base station based on a result of the detection.

The frequency allocation method further includes: detecting, by the controller, statuses of the unlicensed frequency bands; ranking, by the controller, the unlicensed frequency bands based on a result of the detection; and allocating the unlicensed frequency bands to the multiple macro base stations in a mutually exclusive manner based on the ranks.

The frequency allocation method further includes: detecting, by the macro base station, a radar signal for the unlicensed frequency bands exclusively occupied, and notifying, by the macro base station, the small base station of information indicating available unlicensed frequency bands on which no radar signal exists among the unlicensed frequency bands exclusively occupied.

The frequency allocation method further includes: determining, by the small base station, whether to access to another unlicensed frequency band other than the accessed specific unlicensed frequency band based on unlicensed frequency band status information fed back by a user equipment; and periodically detecting, by the small base station, radar interference status for the accessed specific unlicensed frequency band, and determining, by the small base station, whether to access to another unlicensed frequency band other than the accessed specific unlicensed frequency band based on the radar interference status.

A controller in a communication system includes: a load status acquiring unit configured to acquire traffic load statuses of multiple macro base stations having similar coverage; an allocation information generating unit configured to generate unlicensed frequency band allocation information based on the traffic load statuses; and an allocating unit configured to allocate unlicensed frequency bands to the multiple macro base stations in a mutually exclusive manner based on the unlicensed frequency band allocation information, wherein the macro base stations are operated by different operators.

The controller further includes: a detecting unit configured to detect statuses of the unlicensed frequency bands; and a ranking unit configured to rank the unlicensed frequency bands based on a result of the detection, wherein the allocating unit is configured to allocate the unlicensed frequency bands to the multiple macro base stations in a mutually exclusive manner based on the ranks.

A device at a macro base station side in a communication system includes: a determining unit configured to determine unlicensed frequency bands exclusively occupied by the macro base station among unlicensed frequency band resources, based on unlicensed frequency band allocation information from a controller in the communication system; and a notifying unit configured to notify one or more small base stations within a coverage of the macro base station of information indicating the unlicensed frequency bands exclusively occupied by the macro base station.

The device at the macro base station side further includes a radar signal detecting unit configured to detect a radar signal for the unlicensed frequency bands exclusively occupied, and generate information indicating available unlicensed frequency bands on which no radar signal exists, wherein the notifying unit is configured to notify the small base stations of the information indicating the available unlicensed frequency bands.

The device at the macro base station side further includes an updating unit configured to update the available unlicensed frequency bands based on feedback information from the small base stations.

A device at a small base station side in a communication system includes: a determining unit configured to determine accessible unlicensed frequency bands for the small base station based on information indicating unlicensed frequency bands exclusively occupied by a macro base station or information indicating available unlicensed frequency bands from the macro base station; and an accessing unit configured to detect statuses of the accessible unlicensed frequency bands, and dynamically access to a specific unlicensed frequency band among the accessible unlicensed frequency bands based on a result of the detection.

The accessing unit is further configured to generate a discovery reference signal and transmit the discovery reference signal on the specific unlicensed frequency band, and generate downlink control information containing information indicative of the specific unlicensed frequency band and transmit the downlink control information to a user equipment managed by the small base station on licensed frequency band, in a case where the specific unlicensed frequency band is detected to be idle.

The device at the small base station side further includes: a detecting unit configured to periodically detect channel status of the accessed specific unlicensed frequency band; and a feedback unit configured to feed back the detected channel status to the macro base station.

The invention claimed is:

1. A controller in a communication system, comprising one or more processors configured to:
   acquire statuses of traffic load with a predetermined quality-of-service (QoS) requirement of a plurality of macro base stations having coverage ranges overlapping with one another;
   detect interference statuses of unlicensed frequency bands;
   allocate the unlicensed frequency bands to the plurality of macro base stations in a mutually exclusive manner based on the statuses of the traffic load with the predetermined QoS requirement and the detected interference statuses of the unlicensed frequency bands, such that a first unlicensed frequency band with a first interference status is allocated to a first macro base station with a first status of the traffic load with the predetermined QoS requirement, and that a second unlicensed frequency band with a second interference status is allocated to a second macro base station with a second status of the traffic load with the predetermined QoS requirement, the first interference status indicating lower interference than the second interference status, the first status of the traffic load with the predetermined QoS requirement being heavier than the second status of the traffic load with the predetermined QoS requirement; and
   generate unlicensed frequency band allocation information indicating the allocation of the unlicensed frequency bands,
   wherein the plurality of macro base stations are operated by different operators.

2. The controller according to claim 1, wherein the one or more processors are further configured to rank the unlicensed frequency bands based on the detected interference statuses.

3. The controller according to claim 2, wherein the interference status of the unlicensed frequency band comprises signal to interference and noise ratio (SINR) of the unlicensed frequency band.

4. The controller according to claim 1, further comprising a transceiver configured to acquire the status of the traffic load with low QoS requirement from the plurality of macro base stations and allocate the unlicensed frequency bands to the macro base stations, via an S1 interface.

5. A device at a macro base station side in a communication system, comprising
   one or more processors configured to:
   acquire unlicensed frequency band allocation information from a controller in the communication system, to determine unlicensed frequency bands exclusively occupied by the macro base station among unlicensed frequency band resources; and
   generate information indicating the unlicensed frequency bands exclusively occupied by the macro base station, and notify one or more small base stations within a coverage of the macro base station of the unlicensed frequency bands exclusively occupied, wherein
   the unlicensed frequency bands are allocated to a plurality of macro base stations including the device having coverage ranges overlapping with one another in a mutually exclusive manner based on statuses of traffic load with a predetermined QoS requirement and interference statuses of the unlicensed frequency bands, such that a first unlicensed frequency band with a first interference status is allocated to a first macro base station with a first status of the traffic load with the predetermined QoS requirement, and that a second unlicensed frequency band with a second interference status is allocated to a second macro base station with a second status of the traffic load with the predetermined QoS requirement, the first interference status indicating lower interference than the second interference status, the first status of the traffic load with the predetermined QoS requirement being heavier than the second status of the traffic load with the predetermined QoS requirement.

6. The device at the macro base station side according to claim 5, wherein the one or more processors are further configured to detect a radar signal for the unlicensed frequency bands exclusively occupied, and notify the small base stations of information indicating available unlicensed frequency bands on which no radar signal exists among the unlicensed frequency bands exclusively occupied.

7. The device at the macro base station side according to claim 6, wherein the one or more processors are further configured to update the available unlicensed frequency bands based on feedback information from the small base stations.

8. The device at the macro base station side according to claim 6, wherein the device at the macro base station side operates as the macro base station, and further comprises a transceiver configured to transmit the information indicating the unlicensed frequency bands exclusively occupied by the macro base station or the information indicating the available unlicensed frequency bands to the small base stations via an X2 interface.

9. A device at a small base station side in a communication system, comprising
   one or more processors configured to:
   determine accessible unlicensed frequency bands for the small base station based on information which is transmitted from a macro base station managing the small base station and which indicates unlicensed frequency bands exclusively occupied by the macro base station or available unlicensed frequency bands; and
   detect statuses of the accessible unlicensed frequency bands, and dynamically access to a specific unlicensed frequency band among the accessible unlicensed frequency bands based on a result of the detection, wherein
   the unlicensed frequency bands are allocated to a plurality of macro base stations including the macro base station having coverage ranges overlapping with one another in a mutually exclusive manner based on statuses of traffic load with a predetermined QoS requirement and interference statuses of the unlicensed frequency bands, such that a first unlicensed frequency band with a first interference status is allocated to a first macro base station with a first status of the traffic load with the predetermined QoS requirement, and that a second unlicensed frequency band with a second interference status is allocated to a second macro base station with a second status of the traffic load with the predetermined QoS requirement, the first interference status indicating lower interference than the second interference status, the first status of the traffic load with the predetermined QoS requirement being heavier than the second status of the traffic load with the predetermined QoS requirement.

10. The device at the small base station side according to claim 9, wherein the one or more processors are further configured to, in a case where the specific unlicensed frequency band is detected to be idle, generate a discovery reference signal, and map the discovery reference signal onto the specific unlicensed frequency band for transmission.

11. The device at the small base station side according to claim 9, wherein the one or more processors are further configured to, in a case where the specific unlicensed frequency band is detected to be idle, generate downlink control information containing information indicative of the specific unlicensed frequency band, and map the downlink control information onto licensed frequency band to transmit to a user equipment managed by the small base station.

12. The device at the small base station side according to claim 11, wherein the one or more processors are further configured to determine whether to access to another unlicensed frequency band other than the accessed specific unlicensed frequency band based on unlicensed frequency band status information transmitted from the user equipment.

13. The device at the small base station side according to claim 9, wherein the one or more processors are further configured to:
periodically detect channel status of the accessed specific unlicensed frequency band, and feed back the detected channel status to the macro base station; and
determine whether to access to another unlicensed frequency band other than the accessed specific unlicensed frequency band based on the channel status.

14. The device at the small base station side according to claim 13, wherein the channel status indicates radar interference on the accessed specific unlicensed frequency band.

15. The device at the small base station side according to claim 9, wherein the device at the small base station side operates as the small base station, and further comprises a transceiver configured to receive, from the macro base station via an X2 interface, the information indicating unlicensed frequency bands exclusively occupied by the macro base station or the information indicating available unlicensed frequency bands.

16. A frequency allocation method for unlicensed frequency bands, comprising:
acquiring, by a controller, statuses of traffic load with a predetermined quality-of-service (QoS) requirement of a plurality of macro base stations having coverage ranges overlapping with one another;
detecting interference statuses of unlicensed frequency bands;
allocating the unlicensed frequency bands to the plurality of macro base stations in a mutually exclusive manner based on the statuses of the traffic load with the predetermined QoS requirement and the detected interference statuses of the unlicensed frequency bands, such that a first unlicensed frequency band with a first interference status is allocated to a first macro base station with a first status of the traffic load with the predetermined QoS requirement, and that a second unlicensed frequency band with a second interference status is allocated to a second macro base station with a second status of the traffic load with the predetermined QoS requirement, the first interference status indicating lower interference than the second interference status, the first status of the traffic load with the predetermined QoS requirement being heavier than the second status of the traffic load with the predetermined QoS requirement; and
generating unlicensed frequency band allocation information indicating the allocation of the unlicensed frequency bands,
wherein the plurality of macro base stations are operated by different operators.

17. The method according to claim 16, further comprising:
ranking the unlicensed frequency bands based on the detected interference statuses.

18. The method according to claim 16, further comprising:
detecting, by the macro base station, a radar signal for the unlicensed frequency bands exclusively occupied, and notifying a small base station of information indicating available unlicensed frequency bands on which no radar signal exists among the unlicensed frequency bands exclusively occupied.

19. The method according to claim 16, further comprising:
determining, by a small base station, whether to access to another unlicensed frequency band other than the accessed specific unlicensed frequency band based on unlicensed frequency band status information fed back by a user equipment; and
periodically detecting, by the small base station, radar interference status for the accessed specific unlicensed frequency band, and determining whether to access to another unlicensed frequency band other than the accessed specific unlicensed frequency band based on the radar interference status.

* * * * *